United States Patent [19]

Noso et al.

[11] Patent Number: 4,506,378
[45] Date of Patent: Mar. 19, 1985

[54] SPOKEN-INSTRUCTION CONTROLLED SYSTEM FOR AN AUTOMOTIVE VEHICLE

[75] Inventors: Kazunori Noso; Norimasa Kishi; Toru Futami; Hiroyuki Nomura; Yasuhiro Shiraishi, all of Yokosuka, Japan

[73] Assignee: Nissan Motor Company, Limited, Japan

[21] Appl. No.: 408,700

[22] Filed: Aug. 16, 1982

[30] Foreign Application Priority Data

Oct. 6, 1981 [JP] Japan .................. 56-158154

[51] Int. Cl.³ .............................................. G10L 1/00
[52] U.S. Cl. ...................................... 381/43; 367/198
[58] Field of Search ...................... 381/41–43, 381/86; 364/424; 340/52 F, 573; 367/198

[56] References Cited

U.S. PATENT DOCUMENTS 4,087,630  5/1978  Browning et al. .................. 381/41
4,100,370  7/1978  Suzuki et al. ........................ 381/42
4,158,750  6/1979  Sakoe et al. ......................... 381/43
4,393,271  7/1983  Fujinami et al. .................... 381/43

FOREIGN PATENT DOCUMENTS 916781  1/1963  United Kingdom .

OTHER PUBLICATIONS

D. Raj Reddy, "Speech Recognition by Machine: A Review", Proceedings of the IEEE, vol. 64, No. 4, Apr. 1976.

S. L. Dunik, "Phoneme Recognizer Using Formant Ratios", IBM Technical Disclosure Bulletin, vol. 22, No. 11, Apr. 1980.

Primary Examiner—E. S. Matt Kemeny
Attorney, Agent, or Firm—Lowe, King, Price & Becker

[57] ABSTRACT

To avoid pinched fingers, a verbal "Stop Window" command causes a stop and momentary reversal of window motion. A spoken-instruction controlled system for an automotive vehicle which can stop a moving device such as a door window closing device after having driven it reversely for a fixed period when a spoken instruction is inputted thereto through a microphone. In the system according to the present invention, even if there exists a time delay from when the driver utters the spoken instruction to when the device stops perfectly, it is possible to stop the device at or before a position at which the driver utters the spoken instruction. The system according to the present invention comprises at least one motor reversing controller and a timer unit, in addition to the conventional spoken-instruction controller including at least one switch, at least one motor stop controller and a speech recognizer.

9 Claims, 12 Drawing Figures

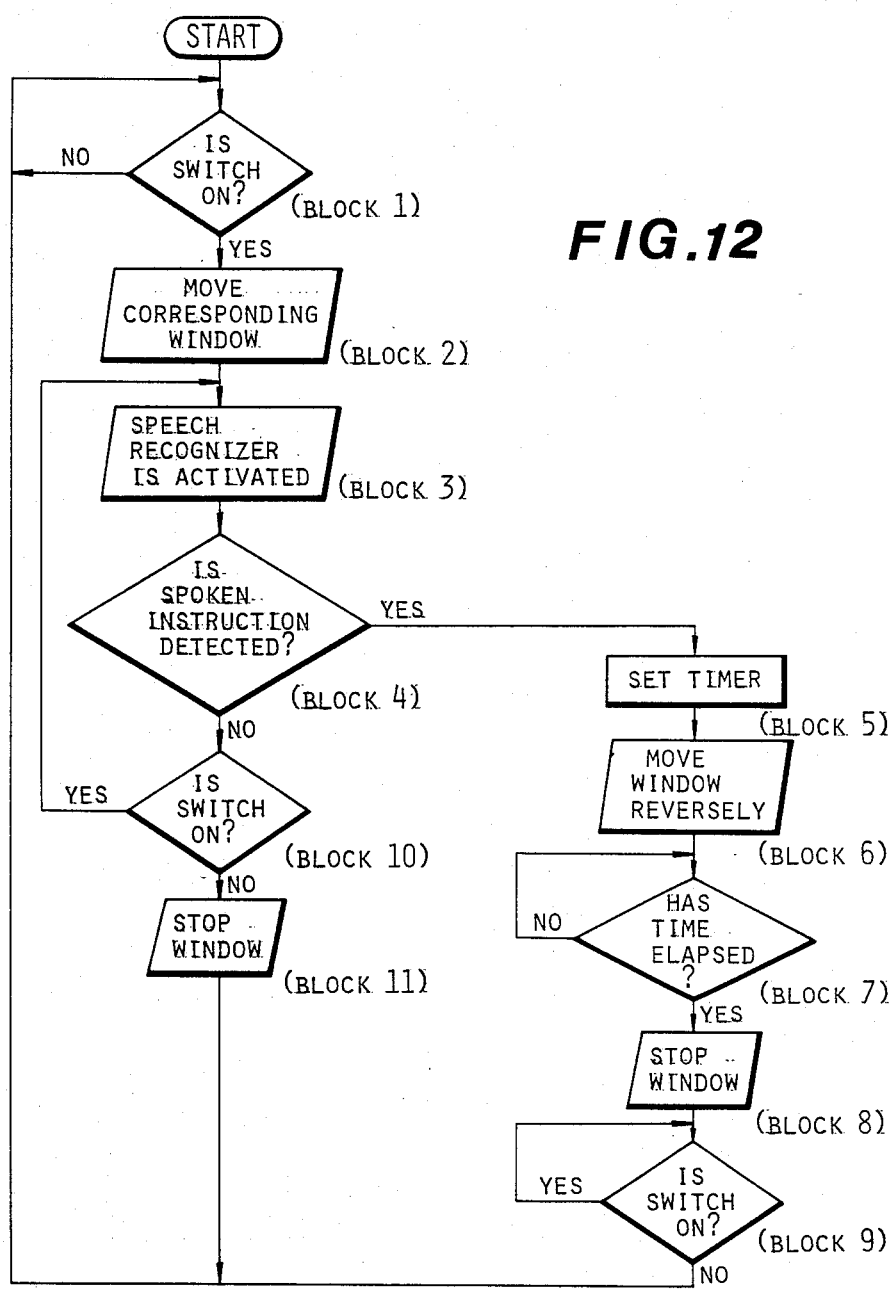

SPOKEN-INSTRUCTION CONTROLLED SYSTEM FOR AN AUTOMOTIVE VEHICLE

BACKGROUND OF THE INVENTION

1. Field of the Invention

The present invention relates generally to a spoken-instruction controlled system for an automotive vehicle, and more specifically to a system for an automotive vehicle which can stop a device. for instance, such as a door window opening/closing device or a fender-mirror adjusting device which is being operated by a motor, in response to a driver's spoken instruction.

2. Description of the Prior Art

Conventionally, there is a well-known speech recognizer which can activate various actuators in response to human spoken instructions. When this speech recognizer is mounted on an automotive vehicle, the headlight, for instance, can be turned on or off in response to a driver's spoken instruction such as "Headlight on" or "Headlight off". The speech recognizer is very convenient because various spoken instructions can be recognized in order to control various actuators, without depressing switches; however, there are some problems involved in applying this system to an automotive vehicle. When this system is used for opening or closing vehicle door windows in response to a spoken instruction, since there inevitably exists a time delay of approximately 0.2 seconds from when a spoken instruction is inputted to the system to when the vehicle door window stops perfectly, it is practically impossible to stop the door window the instant the spoken instruction is inputted to the system. Accordingly, for instance, when the driver finds out a state where some passenger's fingers are pinched between a moving door window and a window frame and utters a spoken instruction such as "Stop window" in a hurry, a dangerous situation may occur in that the moving vehicle door window stops after having pinched the fingers more tightly.

A more detailed description of a typical speech recognizer and a prior-art spoken-instruction controlled system will be made with reference to the attached drawing in conjunction with the present invention under Detailed Description of the Preferred Embodiments.

SUMMARY OF THE INVENTION

With these problems in mind therefore, it is the primary object of the present invention to provide a spoken-instruction controlled system for an automotive vehicle which can stop a moving device such as a door window opening/closing device after having driven it reversely for a fixed period of time in response to the driver's spoken instruction.

In the spoken-instruction controlled system according to the present invention, even if there exists a time delay from when the driver utters the spoken instruction to when the device stops perfectly, it is possible to stop the device at or before a position at which the driver requires to stop it and utters the spoken instruction. In other words, it is possible to avoid undesirable situations caused by the delay time.

To achieve the above-mentioned object, the speech instruction controlled system for an automotive vehicle according to the present invention comprises at least one motor reversing controller for outputting a first power signal to drive a motor in one direction when at least one switch is set to one position and a second power signal to drive the motor in the other opposite direction when the switch is set to the other position, the first and the second power signals being switched only once in response to a spoken instruction, at least one motor stop controller for cutting off either of the first and second power signals after the motor has been driven reversely for a fixed period of time, and a timer unit for determining the timer period during which the motor is driven reversely, in addition to a typical speech recognizer.

BRIEF DESCRIPTION OF THE DRAWINGS

The features and advantages of the spoken-instruction controlled system for an automotive vehicle according to the present invention will be more clearly appreciated from the following description taken in conjunction with the accompanying drawings in which like reference numerals designate corresponding elements or sections throughout the drawings and in which;

FIG. 12 is a flowchart showing the method of reversing and stopping the door window which is being closed in response to a spoken instruction in according with programs stored in the microcomputer shown in FIG. 11.

DETAILED DESCRIPTION OF THE PREFERRED EMBODIMENTS

To facilitate understanding of the present invention, a brief reference will be made to the principle or operation of a typical prior-art speech recognizer, with reference to FIG. 1.

Figure 1:
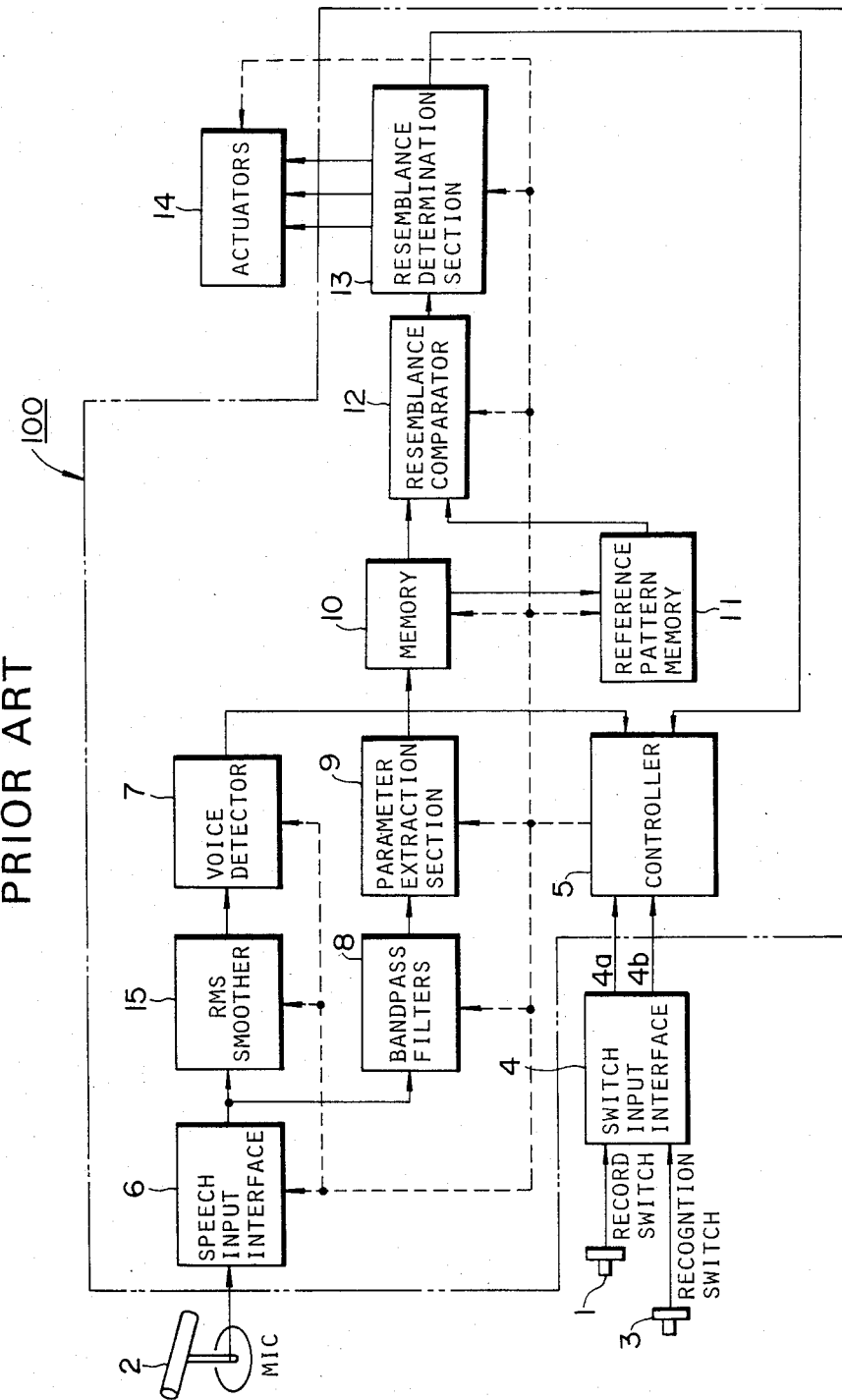
FIG. 1 is a schematic block diagram of a typical speech recognizer for assistance in explaining the operations thereof.

FIG. 1 shows a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 2 and outputs a signal to a controller 5 via a wire 4a. In response to this signal, the controller 5 outputs a recording mode command signal to other sections in order to preset the entire speech recognizer to the recording mode. In the spoken instruction recording mode, when the user says a phrase to be used as a spoken instruction, such as "open doors", near a microphone 2, the spoken phrase is transduced into a corresponding electric signal through the microphone 2, amplified through a speech input interface 6 consisting mainly of a spectrum-normalizing amplifier, smoothed through a root-mean-square (RMS) smoother 15 including a rectifier and a smoother, and finally inputted to a voice detector 7. This voice detector 7 detects whether or not the magnitude of the spoken phrase signals exceeds a predetermined level for a predetermined period of time (150 to 250 ms) in order to determine the start of the spoken phrase input signals and whether or not the magnitude of the signals drops below a predeterined level for a predetermined period of time in order to determine the end of the signals. Upon detection of the start of the signals, this voice detector 7 outputs another recording mode command signal to the controller 5. In response to this command signal, the controller 5 activates a group of bandpass filters 8, so that the spoken phrase signal from the microphone 2 is divided into a number of predetermined frequency bands. Given to a parameter extraction section 9, the frequency-divided spoken phrase signals are squared or rectified therein in order to derive the voice power spectrum for each of the frequency bands and then converted into corresponding digital time-series matrix-phonetic pattern data (explained later). These data are then stored in a memory unit 10. In this case, however, since the speech recognizer is set to the spoken instruction recording mode by the depression of the record switch 1, the time-series matrix-phonetic pattern data are transferred to a reference pattern memory unit 11 and stored therein as reference data for use in recognizing the speech instructions.

After having recorded the reference spoken instructions, the user can input speech instructions, such as "open doors", to the speech recognizer through the microphone 2 while depressing a recognition switch 3.

When this recognition switch 3 is depressed, the switch input interface 4 detects the depression of the recognition switch 3 and outputs a signal to the controller 5 via a wire 4b. In response to this signal, the controller 5 outputs a recognition mode command signal to other sections in order to preset the entire speech recognizer to the recognition mode. In this spoken phrase recognition mode, when the user says an instruction phrase similar to the one recorded previously near the microphone 2 and when the voice detector 7 outputs a signal, the spoken instruction is transduced into a corresponding electric signal through the microphone 2, amplified through the speech input interface 6, filtered and divided into voice power spectra across the frequency bands through the band pass filters 8, squared or rectified and further converted into corresponding digital time-series matrix-phonetic pattern data through the parameter extraction section 9, and then stored in the memory unit 10, in the same manner as in the recording mode.

Next, the time-series matrix-phonetic pattern data stored in the memory unit 10 in the recognition mode are sequentially compared with the time-series matrix-phonetic pattern data stored in the reference pattern memory unit 11 in the recording mode by a resemblance comparator 12. The resemblance comparator 12 calculates the level of correlation of the inputted speech instruction to the reference speech instruction after time normalization and level normalization to compensate for variable speaking rate (because the same person might speak quickly and loudly at one time but slowly and in a whisper at some other time). The correlation factor is usually obtained by calculating the Tchebycheff distance (explained later) between recognition-mode time-series matrix-phonetic pattern data and recording-mode time-series matrix-phonetic pattern data. The correlation factor calculated by the resemblance comparator 12 is next given to a resemblance determination section 13 to determine whether or not the calculated values lie within a predetermined range, that is, to evaluate their cross-correlation. If within the range, a command signal, indicating that a recognition-mode spoken instruction having adequate resemblance to one of the recorded instruction phrases, is outputted to one of actuators 14 in order to open the vehicle doors, for instance. The abovementioned operations are all executed in accordance with command signals outputted from the controller 5.

Description has been made hereinabove of the case where the speech recognizer 100 comprises various discrete elements or sections; however, it is of course possible to embody the speech recognizer 100 with a microcomputer including a central processing unit, a read-only memory, a random-access memory, a clock oscillator, etc. In this case, the voice detector 7, the parameter extraction section 9, the memory 10, the reference pattern memory 11, the resemblance comparator 12 and the resemblance determination section 13 can all be incorporated within the microcomputer, executing the same or similar processes, calculations and/or operations as explained hereinabove.

The digital time-series matrix-phonetic pattern data and the Tchebycheff distance are defined as follows:

In the case where the number of the bandpass filters is four and the number of time-series increments for each is 32, the digital recording-mode time series matrix-phonetic pattern data can be expressed as $$F(A) = f(i,j) = \begin{matrix} f(1,1), f(1,2), f(1,3) \ldots f(1,32) \\ f(2,1), f(2,2), f(2,3) \ldots f(2,32) \\ f(3,1), f(3,2), f(3,3) \ldots f(3,32) \\ f(4,1), f(4,2), f(4,3) \ldots f(4,32) \end{matrix}$$

where A designates a first recording-mode speech instruction (reference) (e.g. OPEN DOORS), i denotes the filter index, and j denotes time-series increment index.

If a first recognition-mode speech instruction (e.g. OPEN DOORS) is denoted by the character "B", the Tchebycheff distance can be obtained from the following expression:

$$l = |F(A) - F(B)| = \sum_{i=1}^{4} \sum_{j=1}^{32} |f^A(i,j) - f^B(i,j)|$$

In view of the above description and with reference to the attached drawings, the background and the embodiments of the present invention will be explained with respect to its application to a door window opening/closing device used for an automotive vehicle.

First, a prior-art spoken-instruction controlled system for an automotive vehicle will be described hereinbelow, by which vehicle door windows can be opened or closed in response to a spoken instruction.

Figure 2:
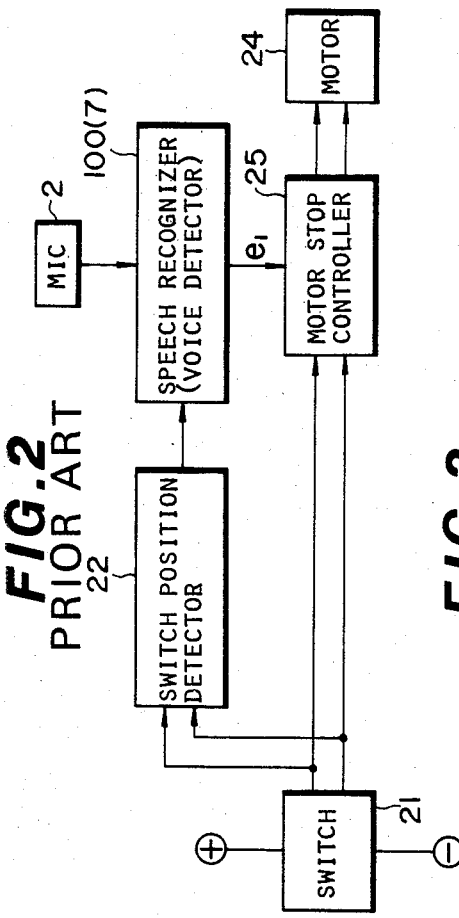
FIG. 2 is a schematic block diagram of a prior-art spoken-instruction controlled system for an automotive vehicle.

In FIG. 2, the reference numeral 21 denotes a window opening/closing switch, the reference numeral 22 denotes a switch position detector, the reference numeral 100 (7) denotes a speech recognizer (voice detector), the reference numeral 24 denotes a door window driving DC motor, and the reference numeral 25 denotes a motor stop controller. Further, in this system, conventionally there are used two types of window opening/closing switch: a one-touch switch (if only the driver touches the switch momentarily, the window is kept moved even after the switch is released. In the case of this switch, a latch circuit is necessary) and a push-button switch (only while the switch is kept depressed, the window is kept moved. In the case of this switch, no latch circuit is necessary).

When the door window opening/closing switch 21 is set to the window-close position, the door window driving motor 24 is driven so as to move up the windows to the extreme window-close position; when the door window opening/closing switch 21 is set to the window-open position, the door window driving motor 24 is driven in the reverse direction so as to move down the window to the extreme window-open position.

Additionally, since there is provided the motor stop controller 25, the motor 24 can be stopped in response to a spoken instruction uttered by the driver. That is to say, when the door window switch 21 is set to either of the close- or open-position, the switch position detector 22 detects the current switch position and outputs a signal corresponding thereto. In response to this signal, the speech recognizer 100 or the voice detector 7 is activated so as to output a command signal $e_1$ to the motor stop controller 25 in order to stop the ration of the motor 24, when the spoken instruction such as "Stop windows" is inputted through the microphone 2 thereinto.

Therefore, in the spoken-instruction controlled system as described above, it is possible to stop the vehicle door windows at any desired positions by giving a spoken instruction to the system through the microphone 2, without depressing any door window switches 21. Thereupon, however, since there exists a time delay of approximately 0.2 ms from when a spoken instruction is inputted to the speech recognizer 100 or the voice detector 7 to when the vehicle door window stops perfectly, because a time interval is necessary to detect or recognize the spoken instruction, the door window does not stop immediately in response to the spoken instruction. Therefore, the door window will stop at a position after having been moved excessively a distance away from the desirable position.

This delay time may cause a dangerous situation, for instance, when the driver finds out the state where some passenger's fingers are pinched between a moving door window and a window frame and utters a spoken instruction such as "Stop windows" in a hurry, because the moving door window stops after having pinched the fingers more tightly.

In views of the above description and with reference to the attached drawings, the embodiments of the spoken-instruction controlled system for an automotive vehicle according to the present invention will be described hereinbelow, with respect to its application to a door window opening/closing device.

Figure 3:
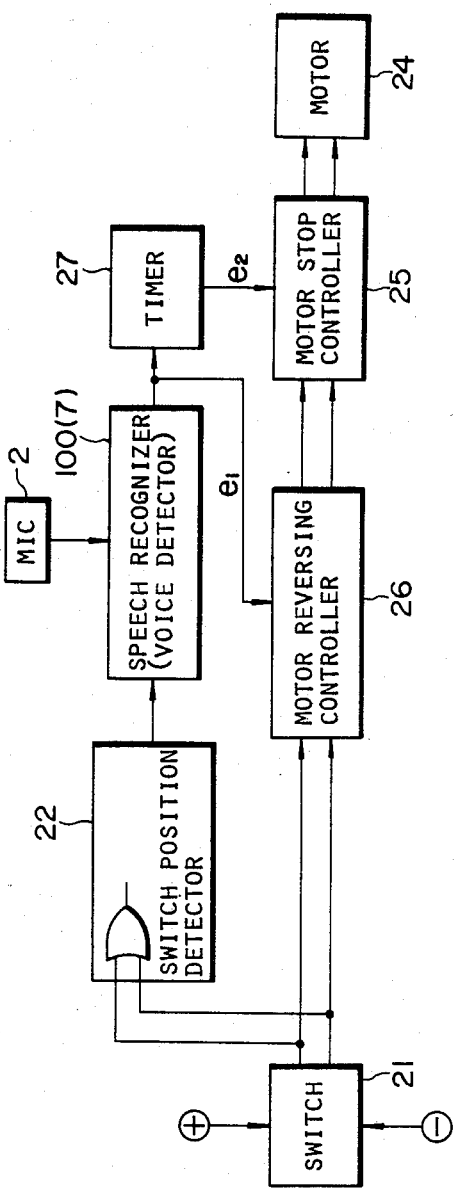
FIG. 3 is a schematic block diagram of a basic embodiment of the spoken-instruction controlled system for an automotive vehicle according to the present invention.

FIG. 3 shows a basic embodiment of the present invention. In the figure, the reference numeral 21 denotes a door window opening/closing switch which is set to either of a window-open position or a window-close position; the reference numeral 22 denotes a switch position detector for detecting whether the window switch 21 is set to the window-open position or the window-close position depending upon the polarity of the DC power supply (because the polarity is switched in order to drive a DC motor in two opposite directions) and outputting a signal corresponding to the window-close position or the window-open position; the reference numeral 100 denotes a speech recognizer activated in response to the signal from the switch position detector 22 and outputting a command signal $e_1$ when a spoken instruction is inputted through a microphone 2 thereinto, which is replaceable with a voice detector 7 for detecting only the start of a spoken phrase; the reference numeral 24 denotes a door window DC motor for opening/closing door windows being driven by the power supply having a predetermined polarity in response to the switch position of the window opening/closing switch 21; the reference numeral 26 denotes a motor reversing controller for reversing the window motor 24 by switching the polarity of the DC power supply in response to a command signal $e_1$ outputted from the speech recognizer 100; the reference numeral 27 denotes a timer unit 21 for outputting a command signal $e_2$ to the motor stop controller 25 a predetermined time period $T_o$ after the speech recognizer 100 outputs a command signal $e_1$ thereto; the reference numeral 25 denotes a motor stop controller for outputting a command signal to cut-off the DC power supply for the window motor 24 in response to a command signal $e_2$ from the timer unit 27.

The time interval $T_o$ preset in the timer unit 27 is predetermined on the basis of the time period required for detecting the spoken instruction in the speech recognizer 100, the sufficient time interval of which is about from 0.2 to 0.8 sec. including a surplus. Furthermore, since there are two types of the window opening/closing switch: one-touch switch and a push-button switch (explained already in explaining the prior-art system), the circuit configurations of the present invention changes according to the types of the window switch 21, as described hereinafter.

Figure 4:
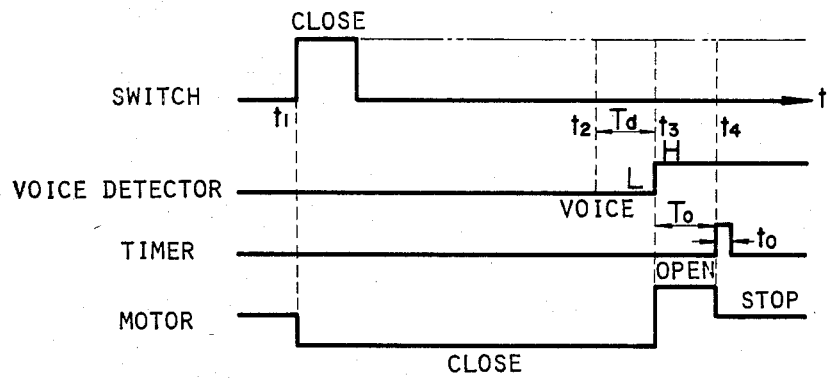
FIG. 4 is a timing chart of the basic embodiment of the spoken-instruction controlled system for an automotive vehicle according to the present invention.

Now, follows a description of the operation of this embodiment of FIG. 3 with reference to a timing chart shown in FIG. 4.

When the window switch 21 is set to the window-close position, the power supply having a polarity determined by the window switch 21 is supplied to the DC window motor 24 via the motor reversing controller 26 and the motor stop controller 25 at the time $t_1$, so that the window motor 24 is driven in the direction to close the door window (upwards). Next, when the driver utters a predetermined spoken instruction such as "Stop window" at the time $t_2$ while the door window is being driven, the speech recognizer 100 outputs a H-voltage level command signal $e_1$ at the time $t_3$ a predetermined delay time $T_d$ later. Since this H-voltage level signal is given to the motor reversing controller 26, the controller 26 switches the polarity of the power supply to the window motor 24 so as to drive the motor 24 in the opposite direction, with the result that the upward-moving window is moved reversely, that is, driven in the direction to open the window (downwards). Simultaneously, since the H-voltage level signal $e_1$ from the speech recognizer 100 is applied to the timer unit 27, the time unit 27 starts counting time and outputs another H-voltage level command signal $e_2$ at the time $t_4$ a predetermined time period $T_o$ later, with the result that the motor stop controller 25 is activated so as to cut off the power supply to the window motor 24, that is, to stop the window motor 24. Further, in the case where the door window switch 21 is set to the window-open position, the operation thereof is quite the same, therefore the description thereof being omitted therein.

As described above, in the spoken-instruction controlled system according to the present invention, since the moving door window is first driven reversely in response to the spoken instruction a predetermined period of time $T_d$ later for a predetermined period of time $T_o$ and then stopped at or before the position at which the spoken instruction is uttered, it is possible to stop the door window at a position at which the driver requires to stop it. Therefore, in case some passenger's fingers are pinched between the moving window and a window frame, it is possible to prevent a dangerous situation such that the moving window stops after having pinched the fingers more tightly.

Figure 5:
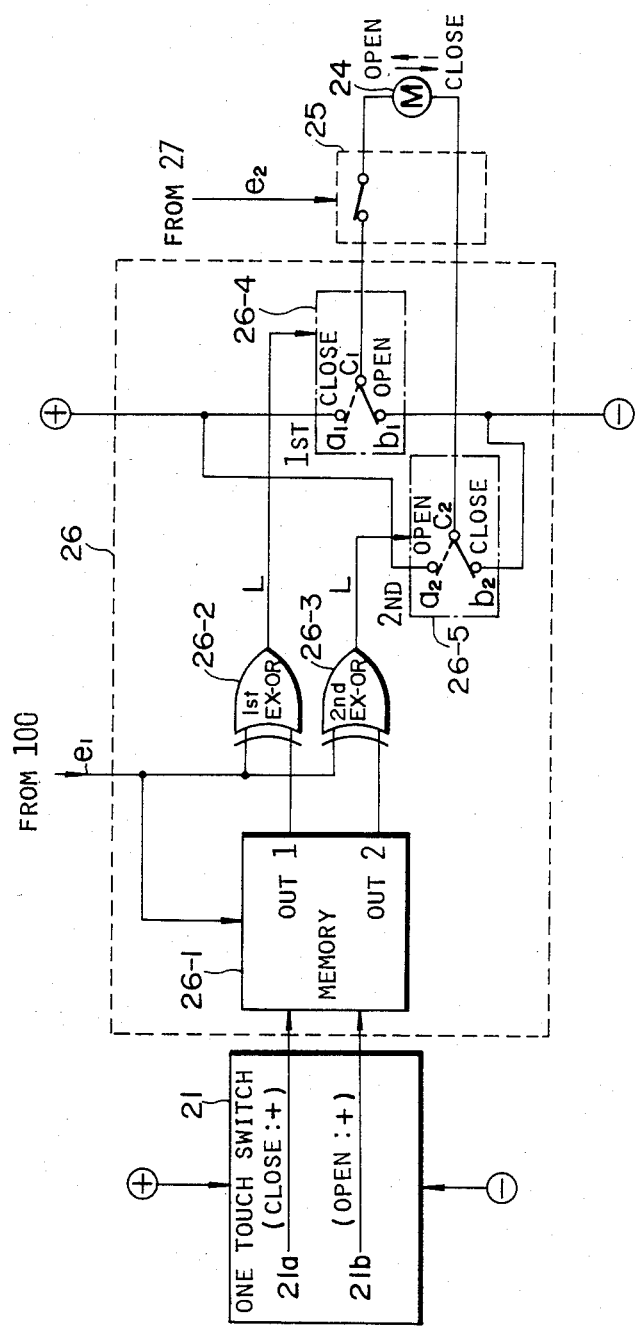
FIG. 5 is a fragmentary schematic block diagram of an essential portion of a first embodiment of the spoken-instruction controlled system for an automotive vehicle according to the present invention.

FIG. 5 shows a schematic block diagram of an essential portion of the first embodiment of the spoken-instruction controlled system according to the present invention, in which a one-touch type door window switch is used (the door window is kept moved even after the switch is released) including the motor reversing controller 26 and the motor stop controller 25.

In the figure, the door window switch 21 includes a first signal wire 21a through which a positive power signal is outputted when the switch 21 is set to the window close position and a second signal wire 21b through which a positive power signal is outputted when the switch 21 is set to the window open position, in order to determine whether the window switch 21 is set to the close position or open position.

A memory unit 26-1 provided in the motor reversing controller 26 latches the above-mentioned positive signals, respectively, in order to latch the initial switch position. These latched signals are outputted through the output terminals 1 and 2, respectively. To these output terminals 1 and 2, one of two input terminals of a first exclusive-OR gate 26-2 and one of those of a second exclusive-OR gate 26-3 are connected. The other of the two input terminals of the first and second exclusive-OR gates 26-2 and 26-3 are connected to the speech recognizer 100 to receive the command signal $e_1$, respectively.

An exclusive-OR gate outputs a H-voltage level signal only when any of the input terminals is at a H-voltage level but a L-voltage level signal when all of the input terminals are at a H- or L-voltage level. Each of the output terminals of the two exclusive-OR gates 26-2 and 26-3 is connected to a first change-over relay 26-4 and a second change-over relay 26-5, respectively, in order to switch each of movable contacts $c_1$ and $c_2$ when these relays are energized. When each output of the two exclusive-OR gates 26-2 and 26-3 is at a L-voltage level, the changeover relays 26-4 and 26-5 are set in the state shown by solid lines in FIG. 5, that is, each of the movable contacts $c_1$ and $c_2$ is in contact with the fixed contact $b_1$ or $b_2$, respectively. On the other hand, when each output of the two exclusive-OR gates 26-2 and 26-3 is at a H-voltage level, the change-over relays 26-4 and 26-5 are set in the state shown by broken lines in FIG. 5, that is, each of the movable contacts $c_1$ and $c_2$ is brought into contact with the fixed contact $a_1$ or $a_2$, respectively. These change-over relays 26-4 and 26-5 are used for switching the polarity of the power supply to the DC window motor 24 in response to the signals from the exclusive-OR gates 26-2 and 26-3.

Additionally, to these two change-over relays 26-4 and 26-5, there is connected a relay 25 which is energized in response to the command signal $e_2$ outputted from the timer unit 27 in order to cut off the power supply to the DC window motor 24.

Figure 6:
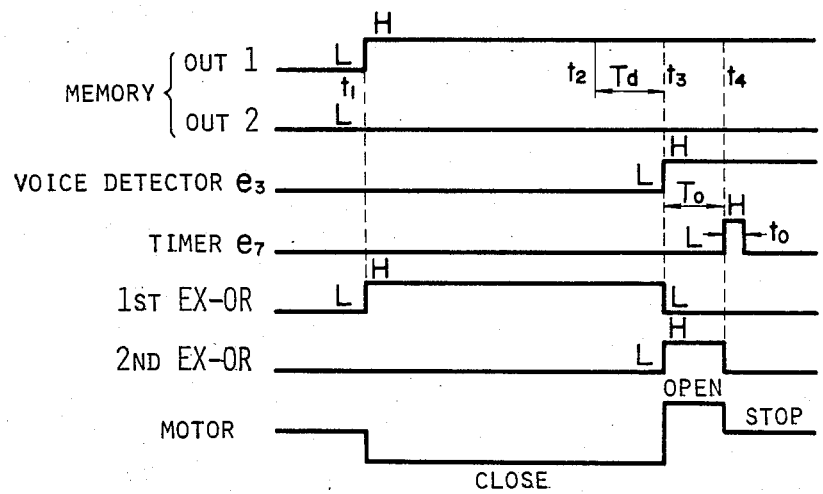
FIG. 6 is a timing chart of the first embodiment of the spoken-instruction controlled system for an automotive vehicle according to the present invention.

Now, follows a description of the operations of this first embodiment of FIG. 5 with reference to a timing chart shown in FIG. 6.

When the window switch 21 is set to the window-close position at the time $t_1$, a positive power signal ($+$) is inputted to the memory unit 26-1 through the wire 21a, therefore the output terminal 1 of the memory unit 26-1 changes to a H-voltage level and the output terminal 2 of the memory unit 26-1 is at a L-voltage level. These signals are latched in the memory unit 26-1; therefore, it is possible to use one-touch switch. In this state, since the command signal $e_1$ from the speech recognizer 100 is at a L-voltage level, the two input terminals of the first exclusive-OR gate 26-2 are at L- and H-voltage levels and therefore the output terminal thereof is at a H-voltage level. On the other hand, the two input terminals of the second exclusive OR gate 26-3 are both at a L-voltage levels and therefore the output terminal thereof is at a L-voltage level. Accordingly, only the first change-over relay 26-4 is energized in response to the H-voltage level signal from the first exclusive-OR gate 26-2; that is, the movable contact $c_1$ is brought into contact with the fixed contact $a_1$, with the second change-over relay 26-5 kept as it is. Since the positive polarity ($+$) of the power supply is connected to the two first fixed contacts $a_1$ and $a_2$ and the negative polarity ($-$) is connected to the two second fixed contacts $b_1$ and $b_2$, respectively, current is passed from the positive polarity of the power supply to the negative polarity thereof via the fixed contact $a_1$, the movable contact $c_1$, two relay contacts of the motor stop controller 25, the window motor 24, the movable contact $c_2$ and the fixed contact $b_2$, in order to drive the window motor 24 in the direction to close the door window. In this state, when the driver utters a predetermined spoken instruction such as "Stop window" at the time $t_2$ while the door window is moving, the command signal $e_1$ from the speech recognizer 100 changes to a H-voltage level at the time $t_3$ a predetermined time period $T_d$ later from the time $t_2$. In this state, since the two input terminals of the first exclusive-OR gate 26-2 are both at a H-voltage level, the output terminal thereof changes to a L-voltage level. On the other hand, since the two input terminals of the second exclusive-OR gate 26-3 are at H- and L-voltage levels, the output terminal thereof outputs a H-voltage level signal. Accordingly, the first change-over relay 26-4 is deenergized in response to the L-voltage level signal from the first exclusive-OR gate 26-2; that is, the movable contact $c_1$ is brought into contact with the fixed contact $b_1$. Simultaneously, the second change-over relay 26-5 is energized in response to the H-voltage level signal from the second exclusive-OR gate 26-3; that is, the movable contact $c_2$ is brought into contact with the fixed contact $a_2$. Therefore, current is passed reversely from the positive polarity of the power supply to the negative polarity thereof via the fixed contact $a_2$, the movable contact $c_2$, the window motor 24, two relay contacts of the motor stop controller 25, the movable contact $c_1$, and the fixed contact $b_1$, in order to derive the window motor 24 in the direction to open the door windows. That is to say, the door windows are moved reversely at the time $t_3$. On the other hand, a predetermined period of time $T_o$ after the speech recognizer 100 outputs the command signal $e_1$, since the timer unit 27 outputs a H-voltage signal $e_2$ to the motor stop controller 25, the relay is energized to open the contacts thereof. Therefore, the power supply to the window motor 24 is cut off to stop the motor 24. Further, in this embodiment, when the signal $e_2$ is outputted from the timer unit 27, the signal wires $1a$ and $1b$ are both reset to a L-voltage level, returning to the original state shown in FIG. 5. Furthermore, since the memory unit 26-1 is provided for the motor reversing controller 26, even if a one-touch switch is used; in other word, if a switch is released immediately after having been depressed, it is possible to continue to drive the window motor 24.

In short, the operations are as follows in this first embodiment:
(1) close-portion: output 1=H, output 2=L, $e_1$=L; EX-OR(1)=H, EX-OR(2)=L; from + to − via $a_1$, $c_1$, motor, $c_2$ and $b_2$ (motor closed); if $e_1$=H; EX-OR(1)=L, EX-OR(2)=H; from + to − via $a_1$, $c_2$, motor, $c_1$ and $b_1$ (motor opened).
(2) open-position: output 1=L, output 2=H, $e_1$=L; EX-OR(1)=L, EX-OR(2)=H; from + to − via $a_2$, $c_2$, motor, $c_1$ and $b_1$ (motor opened); if $e_1$=H; EX-OR(1)=$H_1$, EX-OR(2)=L; from + to − via $a_1$, $c_1$, motor, $c_2$ and $b_2$ (motor closed).

Figure 7:
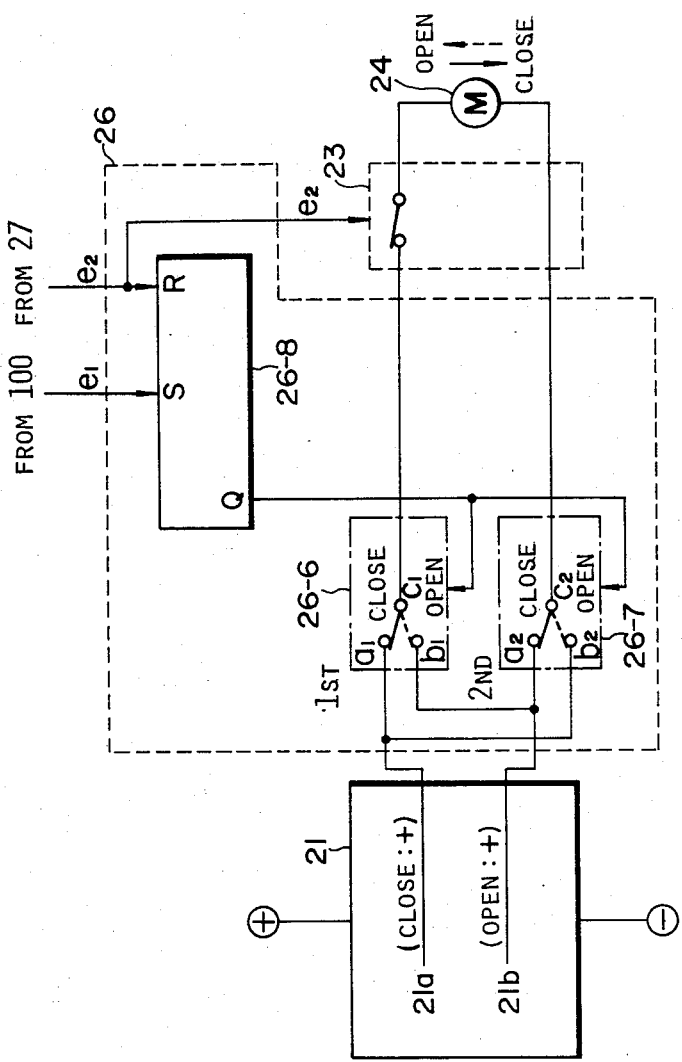
FIG. 7 is a fragmentary schematic block diagram of an essential portion of a second embodiment of the spoken-instruction controlled system for an automotive vehicle according to the present invention.

FIG. 7 shows a fragmentary schematic diagram of an essential portion of the second embodiment of the spoken instruction controlled system according to the present invention, in which a push-button type door window switch is used (the door windows are moved only while the switch is kept depressed), including the motor reversing controller 26 and the motor stop controller 25.

In the figure, the reference numeral 26-8 denotes a flip-flop provided in the motor reversing controller 26, which is set by the command signal $e_1$ from the speech recognizer 100 and reset by the command signal $e_2$ from the timer unit 7. The reference numeral 26-6 denotes a first change-over relay and the reference numeral 26-7 denotes a second change-over relay, which are both energized in response to a H-voltage level signal from the output terminal Q of the flip-flop 26-8.

Now, follows a description of the operations of this second embodiment of FIG. 7.

When the window switch 21 is set to the window-close position, the positive polarity (+) of the power supply is connected to a power line $21a$ and a negative polarity (−) of the power supply is connected to a power line $21b$. Therefore, current is passed from the positive polarity to the negative polarity through a fixed contact $a_1$ of the first change-over relay 26-6, a movable contact $c_1$ thereof, the relay contacts of the motor stop controller 25, the window motor 24, a movable contact $c_2$ of the second change-over relay 26-7, and a fixed contact $a_2$ thereof, in order to drive the window motor 24 in the direction to close the door windows. In this state, since the command signal $e_1$ from the speech recognizer 100 is at a L-voltage level, the flip-flop 26-8 is reset with the output terminal Q thereof kept at a L-voltage level, with the result that the first and second change-over relays 26-6 and 26-7 are deenergized with the movable contacts set as shown by solid lines in FIG. 7.

When the driver utters a predetermined spoken instruction such as "Stop window" while the door window is moving, the command signal $e_1$ from the speech recognizer 100 changes to a H-voltage level, so that the flip-flop 26-8 is set. Therefore, the output terminal Q of the flip-flop 26-8 changes also to a H-voltage level to energize the two change-over relays 26-6 and 26-7 with the movable contacts set as shown by broken lines in FIG. 7. Therefore, current is passed from the positive polarity to the negative polarity through the fixed contact $b_2$ of the second change-over relay 26-7, the movable contact $c_2$ thereof, the window motor 24, the relay contacts of the motor stop controller 25, the movable contact $c_1$ of the first change-over relay 26-6 and the fixed contact $b_1$ thereof, in order to reversely drive the window motor 24 in the direction to open the door window.

After a predetermined period of time $T_o$ has elapsed, the timer unit 27 outputs a H-voltage level signal $e_2$ to the reset terminal R of the flip-flop 26-8 and the motor stop controller 25. Therefore, the flip-flop 26-8 is rest outputting a L-voltage level signal from the output terminal Q, so that the first and second change-over relays 26-6 and 26-7 are both returned again to the original state shown by solid lines in FIG. 7 (the window is closed). In this case, however, the signal $e_2$ is also applied to the motor stop controller 25, the relay is energized to open the relay contact thereof. Therefore, the power supply to the window motor 24 is cut off to stop the window motor 24.

Further, although the relay contacts are closed again after a predetermined period of time $t_o$ because the time unit 27 outputs a L-voltage level signal, in this embodiment, the window motor 24 is driven only while the window switch is kept depressed, the window motor 24 does not move again after the switch is released.

When the window switch 21 is set to the window-open position, the positive polarity (30 ) of the power supply is connected to the power line $21b$ and the negative polarity (−) of the power supply is connected to the power line $21a$. The operations thereof are almost the same as described above; therefore, the description thereof being omitted herein.

In short, the operations are as follows in this second embodiment:
(1) close-position: $21a$=+, $21b$=−, Q=L; from + to − via $a_1$, $c_1$, motor, $c_2$ and $a_2$ (motor closed); if Q=H; from + to − via $b_2$, $c_2$, motor, $c_1$ and $b_1$ (motor opened).
(2) open-position: $21a$=−, $21b$=+, Q=L; from + to − via $a_2$, $c_2$, motor, $c_1$ and $a_1$ (motor opened); if Q=H; from + to − via $b_1$, $c_1$, motor $c_2$ and $b_2$ (motor closed).

Figure 8:
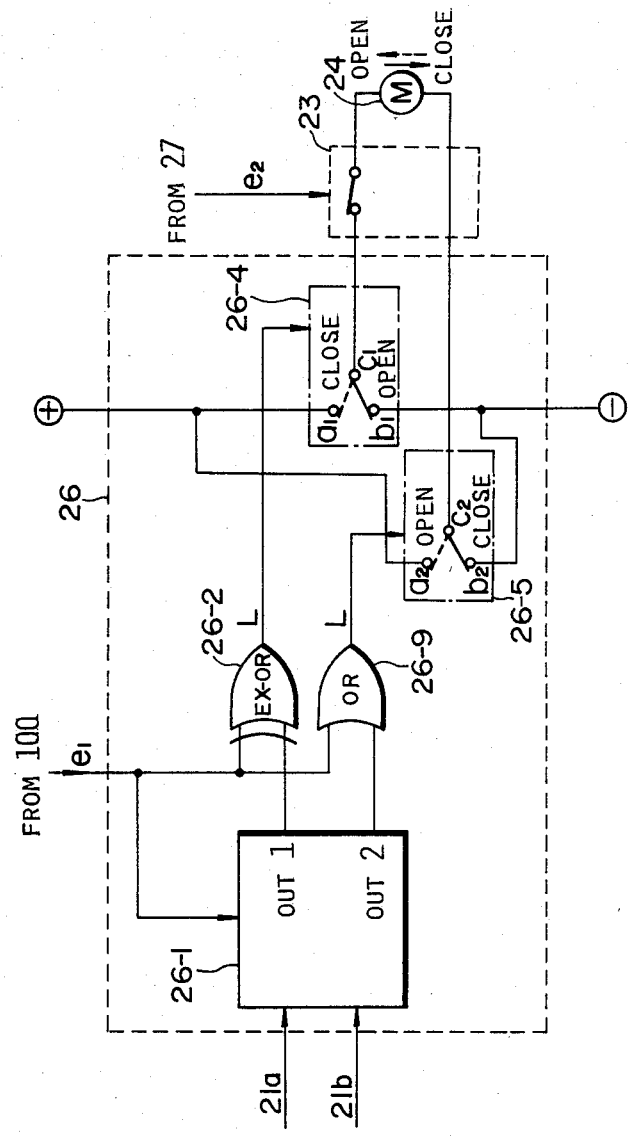
FIG. 8 is a fragmentary schematic block diagram of an essential portion of a third embodiment of the spoken-instruction controlled system for an automotive vehicle according to the present invention.

FIG. 8 shows a fragmentary schematic block diagram of an essential portion of a third embodiment of the spoken-instruction controlled system according to the present invention, in which the door window is reversely driven and next stopped only while being closed, in response to the spoken instruction.

In this embodiment, an OR-gate 26-9 is provided in place of the second exclusive-OR gate 26-3 shown in FIG. 5, other elements or sections being the same as shown in FIG. 5. Further, in this embodiment, a one-touch type door window switch 21 is used.

The operations of this embodiment are as follows: when the window switch 21 is set to the window-close position, a positive power signal (+) is inputted to the memory unit 26-1 through the wire 21a, therefore the output terminal 1 of the memory unit 26-1 changes to a H-voltage level and the output terminal 2 thereof is at a L-voltage level. These signals are latched in the memory unit 26-1. In this state, since the command signal $e_1$ from the speech recognizer 100 is at a L-voltage level, the input terminals of the first exclusive-OR gate 26-2 are at L- and H-voltage levels and therefore the output terminal thereof is at a H-voltage level. On the other hand, the input terminals of the OR gate 26-9 are both at L-voltage levels and therefore the output terminal thereof is at a L-voltage level. Accordingly, only the first change-over relay 26-4 is energized in response to the H-voltage level signal from the first exclusive-OR gate 26-2; that is, the movable contact $c_1$ is brought into contact with the fixed contact $a_1$, with the second change-over relay 26-5 kept as it is. Therefore, current is passed from the positive polarity of the power supply to the negative polarity thereof through the fixed contact $a_1$, the movable contact $c_1$, two relay contacts of the motor stop controller 25, the window motor 24, the movable contact $c_2$ and the fixed contact $b_2$, in order to drive the window motor 24 in the direction to close the door window. When the driver utters a predetermined spoken instruction such as "Stop window" while the door window is moving, the command signal $e_1$ from the speed recognizer 100 changes to a H-voltage level. In this state, since the two input terminals of the first exclusive-OR gate 26-2 are both at H-voltage levels, the output terminal thereof changes to a L-voltage level. On the other hand, since the input terminals of the OR gate 26-9 are at H- and L-voltage levels, the output terminal thereof outputs a H-voltage level signal. Accordingly, the first change-over relay 26-4 is deenergized in response to the L-voltage level signal from the first exclusive-OR gates 26-2; that is, the movable contact $c_1$ is brought into contact with the fixed contact $b_1$. The second change-over relay 26-5 is energized in response to the H-voltage level signal from the OR-gate 26-9; that is, the movable contact $c_2$ is brought into contact with the fixed contact $a_2$. Therefore, current is passed reversely from the positive polarity of the power supply to the negative polarity thereof through the fixed contact $a_2$, the movable contact $c_2$, the window motor 24, two relay contacts of the motor stop controller 25, the movable contact $c_1$, and the fixed contact $b_1$, in order to drive the window motor 24 in the direction to open the door windows. That is to say, the door window is moved reversely. On the other hand, when the timer unit 27 outputs a H-voltage signal $e_2$ to the motor stop controller 25, the relay is energized to open the contacts thereof. Therefore, the power supply to the window motor 24 is cut off to stop the motor 24.

In contrast with this, when the one-touch window switch 21 is set to the window-open position, a positive power signal (+) is inputted to the memory unit 26-1 through the wire 21b, therefore the output terminal 2 of the memory unit 26-1 changes to a H-voltage level, with the output terminal 1 thereof kept at a L-voltage level. In this state, since the command signal $e_1$ from the speech recognizer 100 is at a L-voltage level, the input terminals of the first exclusive-OR gate 26-2 are both at a L-voltage level and therefore the output terminal thereof is at a L-voltage level. On the other hand, the input terminals of the OR gate 26-5 are at L- and H-voltage levels and therefore the output terminal thereof is at a H-voltage level. Accordingly, only the second change-over relay 26-5 is energized in response to the H-voltage level signal from the OR gate 26-5; that is, the movable contact $c_2$ is brought into contact with the fixed contact $a_2$, with the first change-over relay 26-4 kept as it is. Therefore, current is passed from the positive polarity of the power supply to the negative polarity thereof through the fixed contact $a_2$, the movable contact $c_2$, the window motor 24, two relay contacts of the motor stop controller 25, the movable contact $c_1$ and the fixed contact $b_1$ in order to drive the window motor 24 in the direction to open the door window. When the driver utters a predetermined spoken instruction such as "Stop window" while the door window is being opened, the command signal $e_1$ from the speech recognizer 100 changes to a H-voltage level. In this state, since the two input terminals of the first exclusive-OR gate 26-2 are at H- and L-voltage level the output terminal thereof changes to a H-voltage level to bring the movable contact $c_1$ in contact with the fixed contact $a_1$ in the first change-over relay 26-4; however, since the two input terminals of the OR gate 26-9 are also both at a H-voltage level, the output terminal thereof is kept at a H-voltage level as it is, with the movable contact $c_2$ brought into contact with the fixed contact $a_2$. Therefore, the positive polarity (+) of the power supply is applied to both the terminals of the window motor 24, so that the motor 24 stops without rotating in the direction to close the windows.

In short, the operations are as follows in this third embodiment:

(1) close-position: output 1=H, output 2=L, $e_1$=L; EX-OR(1)=H, OR=L; from + to − via $a_1$, $c_1$, motor, $c_2$ and $b_2$ (motor closed); if $e_1$=H; EX-OR(1)=L, OR=H, from + to − via $a_2$, $c_2$, motor, $c_1$ and $b_1$ (motor closed).

(2) open-position: output 1=L, output 2=H, $e_1$=L; EX-OR(1)=L, OR=H; from + to − via $a_2$, $c_2$, motor, $c_1$ and $b_1$ (motor opened), if $e_1$=H; EX-OR(1)=H, OR=H; from + to + via $a_1$, $c_1$, motor $c_2$ and $a_2$ (motor stopped).

Figure 9:
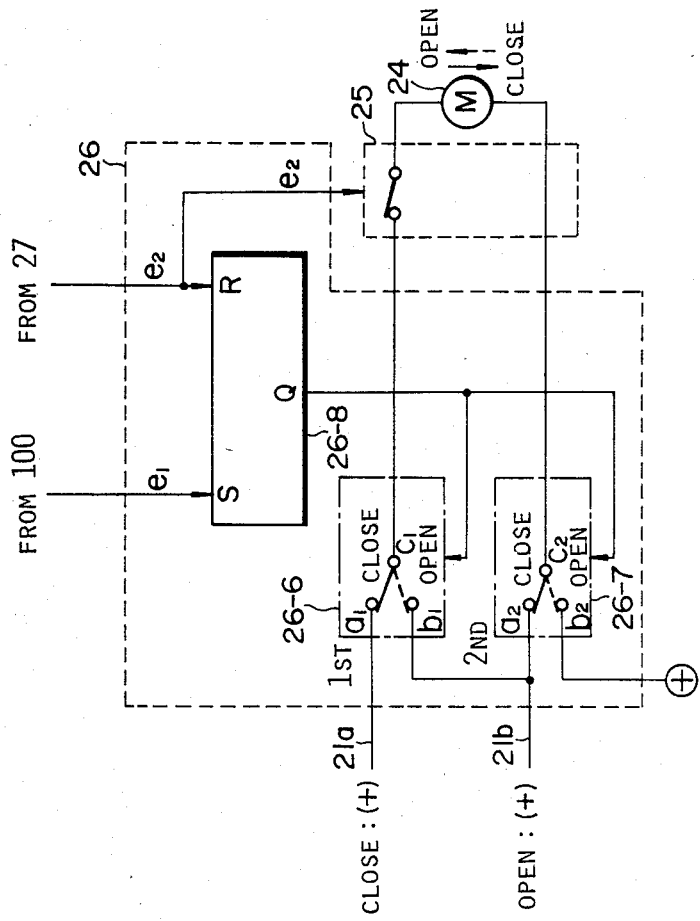
FIG. 9 is a fragmentary schematic block diagram of an essential portion of a fourth embodiment of the spoken-instruction controlled system for an automotive vehicle according to the present invention.

FIG. 9 shows a fragmentary schematic block diagram of an essential portion of a fourth embodiment of the spoken-instruction controlled system according to the present invention, in which the door window is reversely driven and next stopped only while being closed, in response to the spoken instruction, and further the pushbutton type door window switch is arranged.

In this embodiment, a positive polarity of the power supply is directly connected to the fixed contact $b_2$ of the second change-over relay 26-7, independently.

When the window switch 21 is set to the window-close position, the positive polarity (+) of the power supply is connected to the power line 21a and the negative polarity (−) of the power supply is connected to the power line 21b. Therefore, current is passed through the fixed contact $a_1$ of the first change-over relay 26-6, a movable contact $c_1$ thereof, the relay contacts of the motor stop controller 25, the window motor 24, the movable contact $c_2$ of the second change-over relay 26-7, and the fixed contact $a_2$ thereof, in order to drive the window motor 24 in the direction to close the door window. In this state, since the command signal $e_1$ from the speed recognizer 100 is at a L-voltage level, the flip-flop 26-8 is reset with the output terminal Q thereof kept at a L-voltage level, as the result that the first and second change-over relays 26-6 and 26-7 are set as shown by solid lines in FIG. 9. When the driver utters a predetermined spoken instruction such as "Stop window" while the door window is being closed, the command signal $e_1$ from the speech recognizer 100 changes to a H-voltage level, so that the flip-flop 26-8 is set. Therefore, the output terminal Q of the flip-flop 26-8 changes also to a H-voltage level to energize the two change-over relays 26-6 and 26-7 with the movable contacts set as shown by broken lines in FIG. 9. Therefore, current is passed through the fixed contact $b_2$ of the second change-over relay 26-7, the movable contact $c_2$ thereof, the window motor 24, the relay contacts of the motor stop controller 25, the movable contact $c_1$ of the first change-over relay 26-6 and the fixed contact $b_1$ thereof, in order to reversely drive the window motor 24 in the direction to open the door windows.

In contrast with this, when the window switch 21 is set to the window-open position, the positive polarity (+) of the power supply is connected to the power supply line 21b and the negative polarity c-1 of the power supply is connected to the power line 21a. Therefore, current is passed through the fixed contact $a_2$ of the second change-over relay 26-7, the movable contact $c_2$ thereof, the window motor 24, the relay contact of the motor stop controller 25, the movable contact $c_1$ of the first change-over relay 26-6, and the fixed contact $a_1$ thereof, in order to drive the window motor 24 in the direction to open the door windows. In this state, when the driver utters a predetermined spoken instruction such as "Stop window" while the door window is being opened, the command signal $e_1$ from the speech recognizer 100 sets the flip-flop 28-8. Therefore, the output terminal Q thereof changes to a H-voltage level to energize the two change-over relays 26-6 and 26-7 with the movable contacts set as shown by broken lines in FIG. 9. In this state, however, the positive polarity (+) of the power supply is applied to both the terminals of the window motor 24 via two different routes (via the power line 21b and the fixed contact $b_2$), so that the motor 24 stops, without rotating in the direction to close the windows.

In short, the operations are as follows in this fourth embodiment:
(1) closed position: 21a=+, 21b=−, Q=L; from + to − via $a_1$, $c_1$, motor, $c_2$ and $b_1$ (motor closed); if Q=H; from + to − via $b_2$, $c_2$, motor, $c_1$ and $b_1$ (motor opened).
(2) open-position: 21a=−, 21b=+, Q=L; from + to − via $a_2$, $c_2$, motor, $c_1$ and $a_1$ (motor opened); if Q=H; from + to + via $b_2$, $c_2$, motor $c_1$ and $b_1$ (motor stopped).

In the third and fourth embodiments shown in FIGS. 8 and 9, the door window is reversely driven and next stopped, only while the door window is being closed, in response to a predetermined spoken instruction. This is because there exists a danger such that some passenger's fingers may be pinched between a closing window and a window frame only while the window is being closed. Therefore, in these embodiments, the door window is only stopped, while the door window is being opened, in response to a predetermined spoken instruction.

Figure 10:
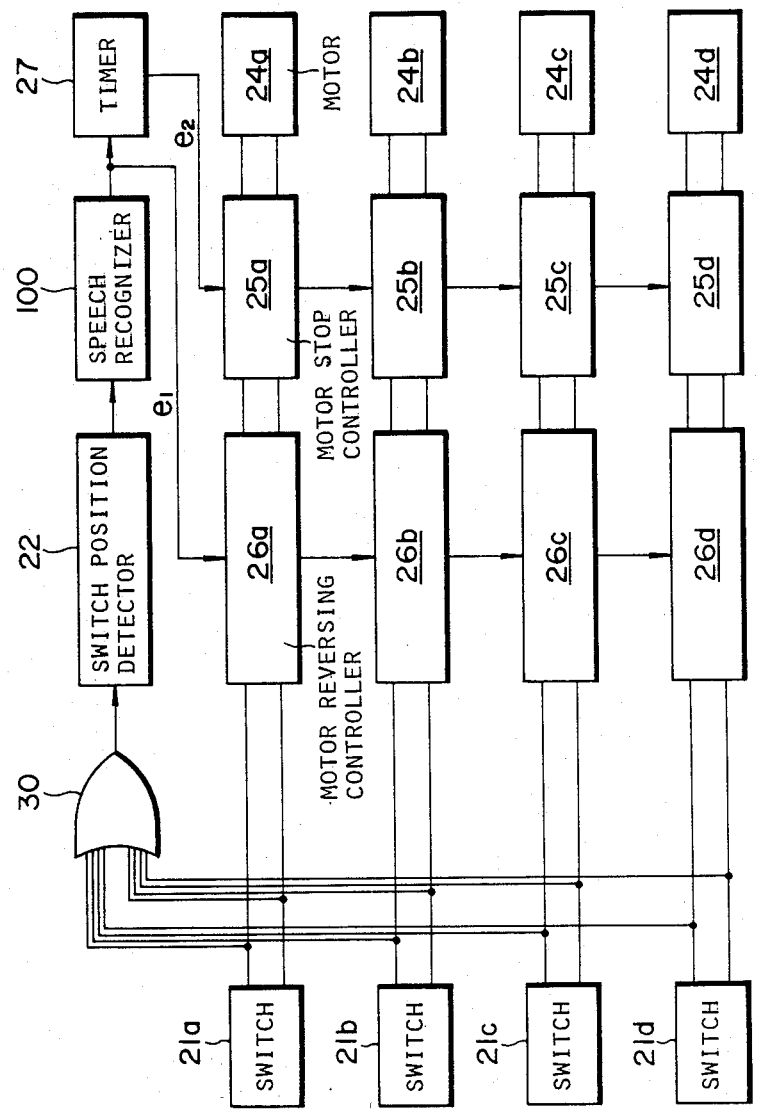
FIG. 10 is a schematic block diagram of the basic embodiment of the spoken-instruction controlled system for an automotive vehicle according to the present invention, which is applied to a power window system for an automotive vehicle.

FIG. 10 shows the spoken-instruction controlled system for an automotive vehicle according to the present invention, which is applied to a power window system.

In the figure, the reference numeral 30 denotes an OR gate. In an automotive vehicle, since there are usually four door windows (front and rear sides and right and left sides), four spoken-instruction controlled systems as described above are provided for four door windows each, independently, excluding the switch position detector 22, the speech recognizer 100, and the timer unit 27. The door window switches 21a–21d, the motor reversing controllers 26a–26d, the motor stop controllers 25a–25d and the window motors 24a–24d are all connected each in series for each window; however, each of the command signals $e_1$ and $e_2$ from the speech recognizer 100 and the timer unit 27 is applied in parallel to all the motor reversing controllers 26a–26d and the motor stop controllers 26a–25d.

Further, in this case, there is additionally provided an OR gate 30 in order to activate the speed position detector 22 whenever one of the four switches 21a–21d is depressed.

Figure 11:
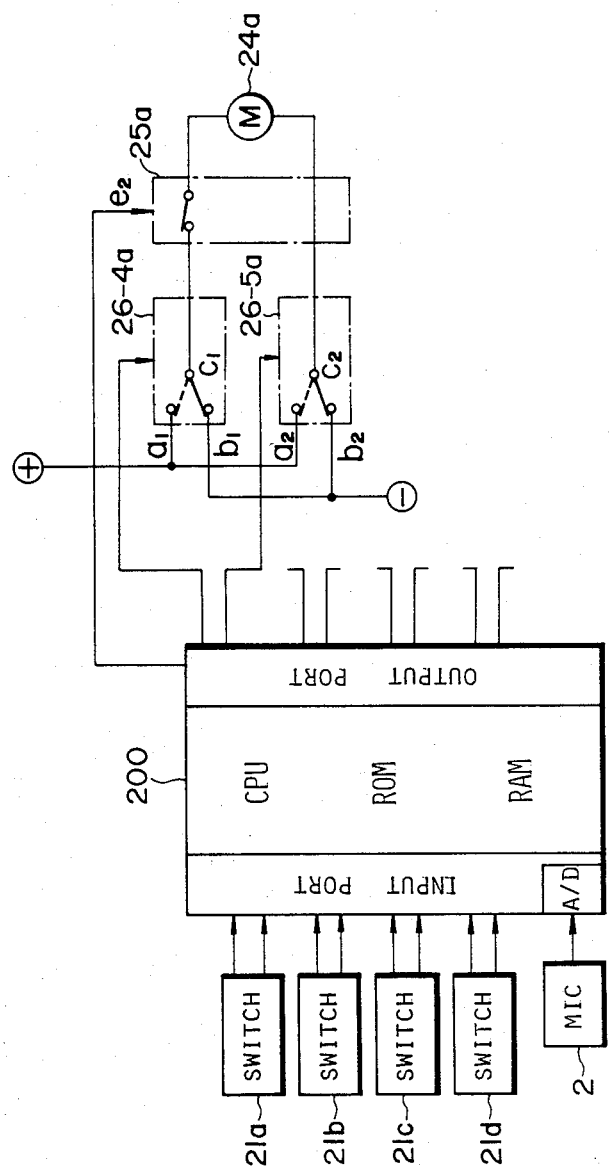
FIG. 11 is a schematic block diagram of a fifth embodiment of the spoken-instruction controlled power window system for an automotive vehicle according to the present invention, in which a microcomputer is included.

FIG. 11 shows a fifth embodiment of the spoken-instruction controlled system according to the present invention, in which a microcomputer is utilized.

In this embodiment, the switch position detector 22, the speed recognizer 100, the timer 27, the motor reversing controller 26 including the memory unit 26-1 and the first and second exclusive-OR gates 26-2 and 26-3 or the flip-flop 26-8 are all incorporated within a microcomputer 200 provided with an analog-to-digital converter, a central processing unit, a read-only memory, a random-access memory, and input/output interfaces, etc. That is to say, the functions of a part of the spoken-instruction controlled system are performed through arithmetic operations executed in accordance with appropriate software, in place of hardware, except the switches 21a to 21d, the first and second change-over relays 26-4a to 26-4d and 26-5a to 26-5d and the motor stop controllers 25a to 25d.

Further, in this embodiment, various elements or sections in the speed recognizer 100 such as parameter extraction section 9, the memory 10, the reference pattern memory 11, the resemblance comparator 12, the resemblance determination section 13, the controller 5, etc. are all incorporated within the microcomputer 200, for achieving the same functions as those of the above-mentioned discrete elements or sections in accordance with appropriate programs stored in the microcomputer 200.

FIG. 12 is a flowchart showing the processing steps of the spoken-instruction controlled system which is applied to a power window system. In the figure, first a program searches whether one of the window switches 21a to 21d is on and whether the switch depressed is set to the window-close position or the window-open position (in block 1). If one of the switches is on, the microcomputer moves a window in a direction corresponding to the currently-set position (in block 2). Thirdly, the speech recognizer 100 is activated for inputting spoken instructions through the microphone 2 (in block 3). Fourthly, the program detects whether a predetermined spoken instruction is inputted thereto (in block 4). If the spoken instruction is detected, fifthly, the timer unit is set (in block 5). Sixthly, the window is moved in the reverse direction (in block 6). Seventhly, the program determines whether a fixed period of time preset in the timer unit has elapsed or not (in block 7). If elapsed, eighthly, the reversely-moving window is stopped (in block 8). Ninthly, the program checks whether the switch is still kept on (in block 9). If off, the program returns to block 1. Further, if no spoken instruction is inputted (in block 4), the program checks whether the window switch is on. If off, the program stops the window at the current position, and returns to block 1 (in block 11). If on, the program returns to block 3 to keep the speech recognizer activated.

Only the embodiments of the spoken-instruction controlled power window system for an automotive vehicle have been described by way of example; however, it is possible to apply the present invention to other systems in which a device is moved in two different directions by depressing a switch, for instance, such as a fender mirror adjusting system.

As described above, in the spoken-instruction controlled system according to the present invention, since a device moving in either of two predetermined opposite directions can be stopped after having been reversely moved for a fixed period of time in response to a predetermined spoken instruction, even if there exists a time delay from when the user utters the spoken instruction to when the device is stopped actually, it is possible to stop the device at or before the position at which the user requires to stop it. Therefore, it is possible to avoid undesirable situations caused by the delay time in the speech recognizer.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A spoken-instruction controlled system for an automotive vehicle which can stop at least one moving device being driven by a motor in either of two opposite directions in response to a predetermined spoken instruction inputted through a microphone, which comprises:
   (a) at least one switch for outputting either of two kinds of signals from two output terminals thereof, separately, and for driving the at least one device in either of two opposite directions when set to either of two set-positions, respectively;
   (b) means for detecting one of the two set-positions in response to either of two signals and outputting signals corresponding thereto;
   (c) a speech recognizer for outputting a command signal $e_1$ in response to the predetermined spoken instruction inputted through the microphone, said speech recognizer being activated by either of two signals from said means for detecting one of the two set-positions, independently;
   (d) a timer unit for outputting a command signal $e_2$ a predetermined time period after the signal $e_1$ has been applied thereto from said speech recognizer;
   (e) at least one means for reversing the motor for outputting a first power signal to drive the motor in one direction in response to one signal outputted from said switch when said switch is set to one set-position and a second power signal to drive the motor in the other opposite direction in response to the other signal outputted from said switch when said switch is set to the other set-position, at least one of the first and second power signals being switched in response to the signal $e_1$ from said speech recognizer in order to drive the motor reversely; and
   (f) at least one means for stopping the motor for cutting off either of the first and second power signals outputted from said means for reversing the motor in response to the signal $e_2$ outputted from said timer unit in order to stop the motor.

2. A spoken-instruction controlled system for an automotive vehicle which can stop at least one moving device being driven by a motor in either of two opposite directions in response to a predetermined spoken instruction inputted through a microphone as set forth in claim 1, wherein said means for reversing the motor comprises:
   (a) a memory unit connected to said switch for storing the two kinds of signal from said switch independently and outputting the first positive power signal to drive the motor in one direction from a first output terminal thereof when said switch is set to a first set position and the second negative power signal to drive the motor in the other direction from a second output terminal thereof when said switch is set to a second set position;
   (b) a first exclusive OR gate one input terminal of which is connected to the first output terminal of said memory unit and the other input terminal of which is connected to said speech recognizer, said first exclusive-OR gate outputting a H-voltage level signal only when either of the input signals thereto is at a H-voltage level;
   (c) a second exclusive OR gate one input terminal of which is connected to the second output terminal of said memory unit and the other input terminal of which is connected to said speech recognizer, said second exclusive OR gate outputting a H-voltage level signal only when either of the input signals thereto is at a H-voltage level;
   (d) a first relay connected to said first exclusive OR gate to be energized or deenergized in response to the H- or L-voltage level signal from said first exclusive OR gate, the movable contact $c_1$ of which is connected to said means for stopping the motor, the first fixed contact $a_1$ of which is connected to the positive polarity of a power supply, the second fixed contact $b_1$ of which is connected to the negative polarity of a power supply, said movable contact $c_1$ being brought into contact with said first fixed contact $a_1$ when said first relay is energized in response to the H-voltage level signal from said first exclusive OR gate and with said second fixed contact $b_1$ when said first relay is deenergized in response to the L-voltage level signal from said first exclusive OR gate;
   (e) a second relay connected to said second exclusive OR gate to be energized or deenergized in response to the H- or L-voltage level signal from said second exclusive OR gate, the movable contact $c_2$ of which is connected to said means for stopping the motor, the first fixed contact $a_2$ of which is connected to the positive polarity of the power supply, the second fixed contact $b_2$ of which is connected to the negative polarity of the power supply, said movable contact $c_2$ being brought into contact with said first fixed contact $a_2$ when said second relay is energized in response to the H-voltage level signal from said second exclusive OR gate and with said second fixed contact $b_2$ when said second relay is deenergized in response to the L-voltage level signal from said second exclusive OR gate.

3. A spoken-instruction controlled system for an automotive vehicle which can stop at least one moving device being driven by a motor in either of two opposite directions in response to a predetermined spoken instruction inputted through a microphone as set forth in claim 1, wherein said means for reversing the motor comprises:
   (a) a flip-flop the set terminal S of which is connected to said speed recognizer and the reset terminal R of which is connected to said timer unit, said flip-flop outputting a H-voltage level signal from an output terminal Q thereof when set in response to the command signal $e_1$ from said speech recognizer and a L-voltage level signal from the output terminal Q thereof when reset in response to the command signal $e_2$ from said timer unit;
   (b) a first relay connected to said flip-flop to be energized or deenergized in response to the H- or L-voltage level signal from said flip-flop, the movable contact $c_1$ of which is connected to said means for stopping the motor, the first fixed contact $a_1$ of which is connected to one of the two output terminals of said switch, the second fixed contact $b_1$ of which is connected to the other of the two output terminals of said switch, said movable contact $c_1$ being brought into contact with said first fixed contact $a_1$ when said first relay is deenergized in response to the L-voltage level signal from said flip-flop and with said second fixed contact $b_1$ when said first relay is energized in response to the H-voltage level signal from said flip-flop; and
   (c) a second relay connected to said flip-flop to be energized or deenergized in response to the H- or L-voltage level signal from said flip-flop, the movable contact $c_2$ of which is connected to said means for stopping the motor, the first fixed contact $a_2$ of which is connected to one of the two output terminals of said switch, the second fixed contact $b_2$ of which is connected to the other of the two output terminals of said switch, said movable contact $c_2$ being brought into contact with said first fixed contact $a_2$ when said second relay is deenergized in response to the L-voltage level signal from said flip-flop and with said second fixed contact $b_2$ when said second relay is energized in response to the H-voltage level signal from said flip-flop.

4. A spoken-instruction controlled system for an automotive vehicle which can stop at least one moving device being driven by a motor in either of two opposite directions in response to a predetermined spoken instruction inputted through a microphone as set forth in claim 1, wherein said means for reversing the motor comprises:
   (a) a memory unit connected to said switch for storing the two kinds of signal from said switch independently and outputting the first positive power signal to drive the motor in one direction from a first output terminal thereof when said switch is set to a first set position and the second negative power signal to drive the motor in the other direction from a second output terminal thereof when said switch is set to a second set position;
   (b) a first exclusive OR gate one input terminal of which is connected to the first output terminal of said memory unit and the other input terminal of which is connected to said speech recognizer, said first exclusive-OR gate outputting a H-voltage level signal only when either of the input signals thereto is at a H-voltage level;
   (c) an OR gate one input terminal of which is connected to the second output terminal of said memory unit and the other input terminal of which is connected to said speech recognizer, said OR gate outputting a H-voltage level signal when at least one of the input signals thereto is at a H-voltage level;
   (d) a first relay connected to said first exclusive OR gate to be energized or deenergized in response to the H- or L-voltage level signal from said first exclusive OR gate, the movable contacts $c_1$ of which is connected to said means for stopping the motor, the first fixed contact $a_1$ of which is connected to the positive polarity of a power supply, the second fixed contact $b_1$ of which is connected to the negative polarity of a power supply, said movable contact $c_1$ being brought into contact with said first fixed contact $a_1$ when said first relay is energized in response to the H-voltage level signal from said first exclusive OR gate and with said second fixed contact $b_1$ when said first relay is deenergized in response to the L-voltage level signal from said first exclusive OR gate;
   (e) a second relay connected to said OR gate to be energized or deenergized in response to the H- or L-voltage level signal from said OR gate, the movable contact $c_2$ of which is connected to said means for stopping the motor, the first fixed contact $a_2$ of which is connected to the positive polarity of the power supply, the second fixed contact $b_2$ of which is connected to the negative polarity of the power supply, said movable contact $c_2$ being brought into contact with said first fixed contact $a_2$ when said second relay is energized in response to the H-voltage level signal from said OR gate and with said second fixed contact $b_2$ when said second relay is deenergized in response to the L-voltage level signal from said OR gate.

5. A spoken-instruction controlled system for an automotive vehicle which can stop at least one moving device being driven by a motor in either of two opposite directions in response to a predetermined spoken instruction inputted through a microphone as set forth in claim 1, wherein said means for reversing the motor comprises:
   (a) a flip-flop the set terminal S of which is connected to said speed recognizer and the reset terminal R of which is connected to said timer unit, said flip-flop outputting a H-voltage level signal from an output terminal Q thereof when set in response to the command signal $e_1$ from said speech recognizer and a L-voltage level signal from the output terminal Q thereof when reset in response to the command signal $e_2$ from said timer unit;

(b) a first relay connected to said flip-flop to be energized or deenergized in response to the H- or L-voltage level signal from said flip-flop, the movable contact $c_1$ of which is connected to said means for stopping the motor, the first fixed contact $a_1$ of which is connected to one of the two output terminals of said switch, the second fixed contact $b_1$ of which is connected to the other of the two output terminals of said switch, said movable contact $c_1$ being brought into contact with said first fixed contact $a_1$ when said first relay is deenergized in response to the L-voltage level signal from said flip-flop and with said second fixed contact $b_1$ when said first relay is energized in response to the H-voltage level signal from said flip-flop; and (c) a second relay connected to said flip-flop to be energized or deenergized in response to the H- or L-voltage level signal from said flip-flop, the movable contact $c_2$ of which is connected to said means for stopping the motor, the first fixed contact $a_2$ of which is connected to one of the two output terminals of said switch, the second fixed contact $b_2$ of which is independently connected to the positive polarity of a power supply, said movable contact $c_2$ being brought into contact with said first fixed contact $a_2$ when said second relay is deenergized in response to the L-voltage level signal from said flip-flop and with said second fixed contact $b_2$ when said second relay is energized in response to the H-voltage level signal from said flip-flop.

6. A spoken-instruction controlled system for an automotive vehicle which can stop at least one moving device being driven by a motor in either of two opposite directions in response to a predetermined spoken instruction inputted through a microphone as set forth in claim 1, wherein said means for detecting one of the two set-positions, said speech recognizer for outputting a command signal $e_1$ and said timer unit for outputting a command signal $e_2$ are incorporated in a microcomputer for executing the same functions as those performed by said discrete means.

7. A spoken-instruction controlled system for an automotive vehicle which can stop at least one moving device being driven by a motor in either of two opposite directions in response to a predetermined spoken instruction inputted through a microphone as set forth in claim 1, wherein said at least one means for stopping the motor is a relay which is opened in response to the signal $e_2$.

8. A spoken-instruction controlled system for an automotive vehicle which can stop at least one moving device being driven by a motor in either of two opposite directions in response to a predetermined spoken instruction inputted through a microphone as set forth in claim 1, wherein the command signal $e_1$ is outputted from the voice detector provided in said speech recognizer.

9. In a spoken-instruction controlled system for an automotive vehicle which can stop at least one moving device being driven by a motor, in response to an ON-signal from at least one switch, in either of two opposite directions, when a predetermined spoken instruction is inputted through a microphone, the method of first driving the device reversely and next stopping it after a predetermined period of time, which comprises the following steps of:

(a) finding one of the switches currently being depressed and one of set-positions of the depressed switch;

(b) actuating a device corresponding to the depressed switch in one direction corresponding to the set position of the depressed switch;

(c) inputting a spoken instruction through the microphone;

(d) detecting the inputted spoken instruction;

(e) setting a timer in response to the detection signal of the spoken instruction;

(f) reversing the device in the opposite direction;

(g) comparing the time period from when the device is reversed with a fixed period set by the timer; and (h) stopping the device currently moving reversely when the fixed period has elapsed.

* * * * *